United States Patent [19]

Gray

[11] Patent Number: 4,890,995
[45] Date of Patent: Jan. 2, 1990

[54] MOLD APPARATUS FOR FORMING SHAPED PLASTIC SHELLS

[75] Inventor: John D. Gray, New Durham, N.H.
[73] Assignee: Davidson Textron Inc., Dover, N.H.
[21] Appl. No.: 332,019
[22] Filed: Mar. 30, 1989

Related U.S. Application Data

[62] Division of Ser. No. 63,837, Jun. 19, 1987, Pat. No. 4,851,177.

[51] Int. Cl.⁴ .................. B29C 35/00; B29C 41/18
[52] U.S. Cl. ........................... 425/144; 264/301; 264/302; 425/185
[58] Field of Search .......... 249/102; 264/40.6, 126, 264/297.1, 297.6, 297.8, 301, 302, 310; 425/144, 183, 185, 434, 435

[56] References Cited

U.S. PATENT DOCUMENTS

| | | | |
|---|---|---|---|
| 3,315,016 | 4/1967 | Wersosky et al. | 264/337 |
| 3,590,435 | 7/1971 | Dunham | 425/73 |
| 3,686,629 | 8/1972 | Gaudreau et al. | 249/79 |
| 3,728,429 | 4/1973 | Colby et al. | 264/303 |
| 4,217,325 | 8/1980 | Colby | 264/303 |
| 4,338,068 | 7/1982 | Suh et al. | 425/144 |
| 4,389,177 | 6/1983 | Colby | 425/435 |
| 4,621,995 | 11/1986 | Wersosky | 264/302 |
| 4,623,503 | 11/1986 | Anestis et al. | 264/302 |
| 4,683,098 | 7/1987 | Belleville et al. | 264/302 |

Primary Examiner—Jay H. Woo
Assistant Examiner—C. Scott Bushey
Attorney, Agent, or Firm—John C. Evans

[57] ABSTRACT

Apparatus for manufacturing a multitude of thin walled hollow plastic shells for parts such as automobile door panels, controls and instrument panels from dry thermoplastic powders includes a mold heating chamber with a tube sheet heating assembly operative to provide a hot air flow pattern with a profile which matches the outer profile of one of a plurality of molds that are selectively placed in the mold heating chamber thereby to uniformly heat a casting surface of the mold by an energy efficient process.

4 Claims, 5 Drawing Sheets

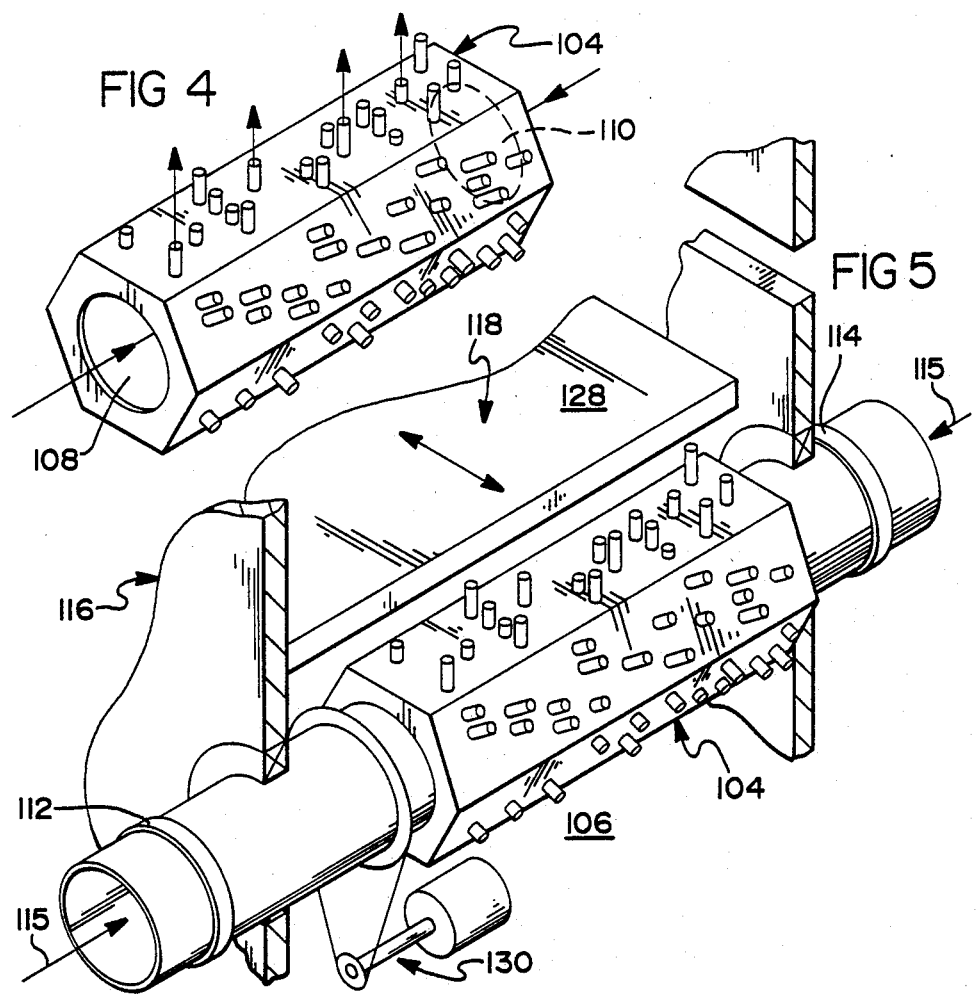
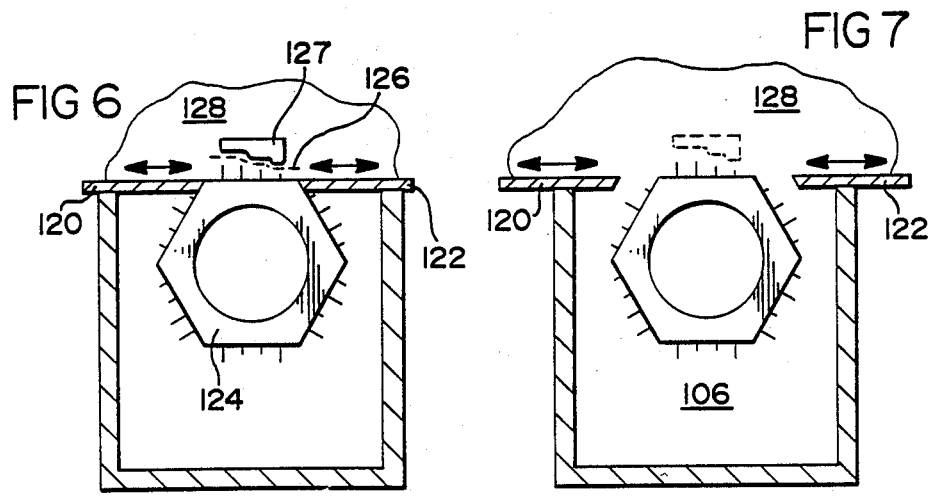

- PROVIDE MOLDS WITH DIFFERENT OUTER PROFILES
- PROVIDE HOT DRUM WITH DIFFERENT TUBE SHEETS
- INDEXABLY SUPPORTING DRUM WITH RESPECT TO MOLDS
- MATCHING SELECTED MOLD TO SELECTED TUBE SHEET
- DIRECTING HEATED AIR THROUGH MATCHED TUBES
- UNIFORMLY INCREASING TEMPERATURE OF MOLD PROFILE

MOLD APPARATUS FOR FORMING SHAPED PLASTIC SHELLS

This is a division of Ser. No. 063,837 filed 6/19/87, now U.S. Pat. No. 4,851,177.

TECHNICAL FIELD

This invention pertains to a method and apparatus for making hollow plastic shells especially suitable for us in automobile trim components such as interior door panels and more particularly to methods and apparatus for processing plastic powder to form shells of differing shape by use of gas heated molds with outer surface shapes corresponding to a selected shell shape.

BACKGROUND ART

The automotive industry has turned to the use of interior trim components such a door panels comprising a polyvinyl chloride shell. See, for example, the trim components disclosed in U.S. Pat. No. 3,123,403. The acceptance of such components has been because inter alia this type of construction permits a wide latitude in styling and color, and grain effects which are most desired particularly in the interior design of automobiles.

The current state of the art includes method to form preformed grained vinyl shells from dry thermoplastic powder particles which are applied to a heated shell mold from a powder box to form a one piece shell whose shape will correspond to that of the mold casting surface. Examples of such method and apparatus are set forth in U.S. Pat. Nos. 3,492,307 issued Jan. 27, 1970, and 4,623,503 issued Nov. 18, 1986. Other devices for heating are set forth in U.S. Pat. Nos. 489,299 issued Jan. 3, 1893; 1,763,290 issued Feb. 22, 1916; 2,288,012 issued June 30, 1942; 2,869,630 issued Jan. 20, 1959; and 3,372,820 issued Mar. 12, 1968.

None of the aforesaid methods and apparatus for manufacture or resultant manufacture is directed to a process or apparatus which includes a rotational tube sheet operative to heat a multitude of mold shapes in an energy efficient manner so as to form single piece shells from heat fusable thermoplastic material of differing shape such as interior panel components of an automobile.

STATEMENT OF INVENTION AND ADVANTAGES

In accordance with one aspect of the present invention a process for forming a shaped shell on a mold includes balancing a heating chamber to efficiently heat a variety of mold shapes by selectively shaping the flow pattern of hot air flow into the chamber to match the surface profile of a mold being heated by the hot air flow.

A feature of the process is that the flow pattern is matched to the shape of the outer surface of each mold as it enters the heating chamber. In a preferred embodiment the flow matching is accomplished by varying the length of air tubes to correspond to the outer surface profile of the mold.

Another aspect of the present invention is to improve a method for heating the casting surface of a mold which includes the step of directing hot air against the outer surface of the mold by providing a hot air drum with an inlet and a plurality of tube sheets each having a plurality of tubes formed thereon of varying length to define a plurality of outlet profiles adapted to match a plurality of different mold shapes; and thereafter selectively positioning one of the tube sheet profiles in alignment with the outer surface profile of one of the molds to uniformly raise the temperature of the mold to cause thermoplastic material to fuse to form a plastic shell on the mold.

In one method the hot air is directed from one tube sheet to impinge on a matched mold surface profile and the air flow is blocked through the remainder of the tube sheets.

In another method the air flow through the drum is passed through only one of the tube sheets while the other of the tube sheets are sealed within a feed chamber to block air flow therethrough so as to concentrate inlet air flow to the drum against a mold profile matched to the selected one of the tube sheets.

Another feature of the present invention is to improve mold heating apparatus which includes a heating chamber arranged to receive molds for heating a casting surface thereon by directing hot gas against the outer surface profile of the mold and wherein the molds have a multitude of outer surface profile shapes and the heating chamber includes access openings for selectively locating one of a plurality of molds in the heating chamber and wherein the improvement comprises a hot air drum formed from a plurality of joined tube sheets defining a multi-sided cylinder with each of the sides having a plurality of tubes formed thereon with variable lengths which define an outlet profile that corresponds to one of the multitude of mold shapes and wherein the drum is operated by indexing means to align a selected one of the tube sheets with a selected one of the molds to match their respective profiles thereby to uniformly heat the mold from a pressurized source of air without balancing the heating chamber size to accommodate differing size and shape molds.

Another feature is to provide mold heating apparatus of the type set-forth in the preceding paragraph wherein the drum is located in a feed chamber and sealed with respect to a single outlet from the feed chamber so that the hot drum will be pressurized from a pressurized source of heated air so that hot gas will be directed from only a selected one of the tube sheets which is matched with the outer profile of mold located within the heating chamber.

Yet another feature of the invention is to provide apparatus of the type set-forth above wherein the hot air drum is supported on means for raising and lowering the drum with respect to the chamber to prevent interference between the tubes of a selected tube sheet and a selected mold as the mold is moved into and out of the heating chamber.

Yet another feature is to provide movable fixture doors to seal the selected tube sheet with respect to the feed chamber whereby the feed chamber will pressurize the hot air indexing assembly.

Still another feature is to configure the aforedescribed drum to have hot air feed from both ends of the drum for even pressurization of the tube array which is selected to heat a selected mold.

Yet another feature of the apparatus set forth in the preceding text is that means are provided to recover the hot air from an enclosed system to be reheated for return flow to the selectively positioned hot air drum.

The aforedescribed system further enables a water cooling station to be used to cool the mold once a thermoplastic shell is cast thereon so that the tubes for gas flow can be tailored solely for hot air heating thereby to reduce the normal hot air cycle time.

In a specific embodiment, the apparatus includes octopus arms which carry a plurality of molds with respect to a plurality of process stations. The process stations include a heating chamber with heated air supplied thereto by means of the indexable hot air drum heater assembly of the present invention. The octopus arms receive molds of a selected outer profile shape at a mold loading station. The indexable hot air drum heater assembly is associated with a heating chamber having an inlet door and an outlet door which open to receive the mold as it is swung into the heating chamber by rotation of the octopus arms. The multi-sided tube sheet assembly operated in combination with a multi-armed casting unit (the octopus machine) provides custom heating profiles for a wide variety of mold shapes which provides manufacturing flexibilty heretofore unachievable.

BRIEF DESCRIPTION OF THE INVENTION

Other advantages and a more complete understanding of the invention will be apparent to those skilled in the art from the succeeding detailed description of the invention and the accompanying drawings thereof wherein:

FIG. 4 is a perspective view of an indexable tube sheet assembly in another embodiment of the present invention;

FIG. 5 is a fragmentary diagrammatic view of the tube sheet assembly of FIG. 4 shown in association with a heating chamber having movable fixture doors defining a port to position a selected one of the tube sheets with respect to the heating chamber;

FIG. 6 is a sectional view showing the position of the fixture doors closed with respect to the selected tube sheet;

FIG. 7 is a sectional view showing the position of the fixture doors opened with respect to the tube sheet assembly prior to matching a tube sheet with a mold of a selected shape;

DETAILED DESCRIPTION OF THE INVENTION

Figure 1:
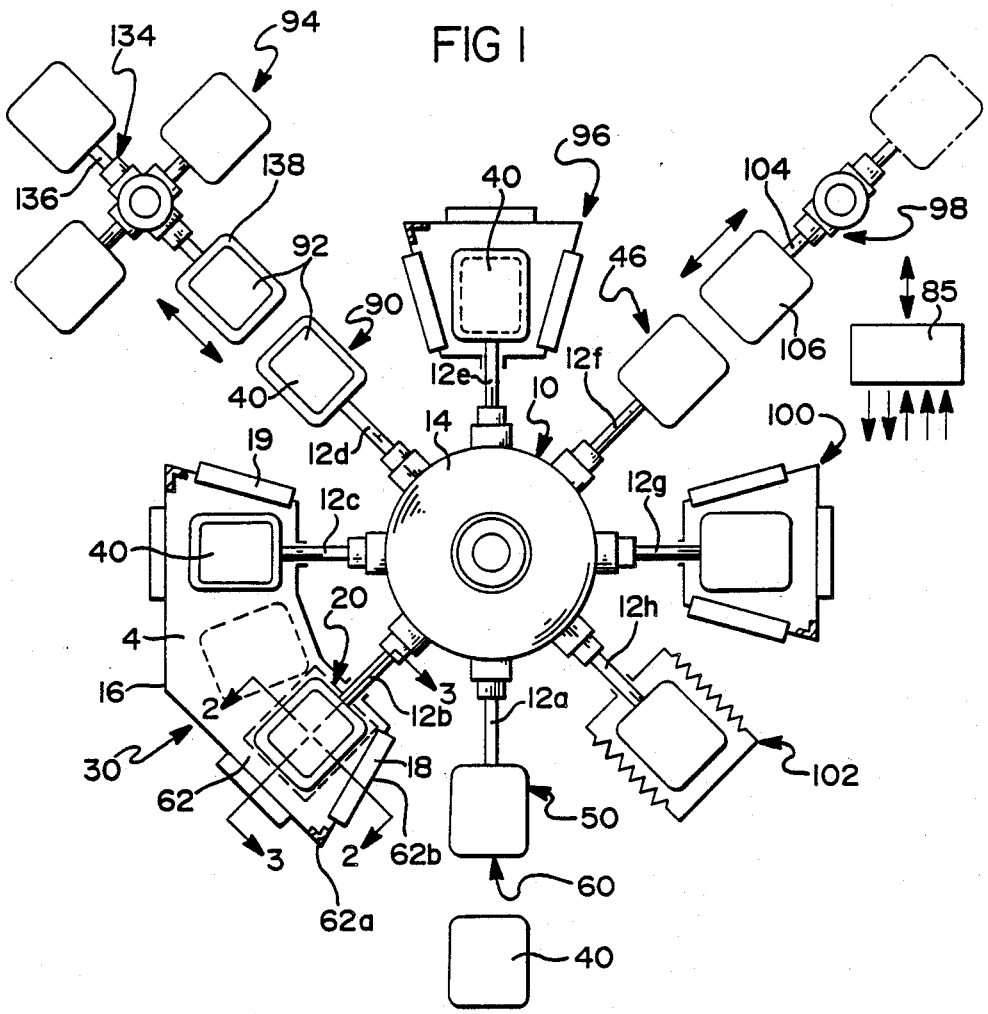
FIG. 1 is a diagrammatic view of molding apparatus including the present invention.

The method and apparatus of the present invention will be described with respect the manufacture of plastic shells having thin walls of the type found on the exterior surface of interior trim parts for automotive use including but not limited to door panels, consoles, instrument panels and arm rests.

In the manufacture of such articles, thermoplastic fusable material in the form of dry plastic particles formed from resins with suitable plasticizers is cast against a mold surface which is heated by suitable means such as a jet of hot air. The mold temperature will cause the particles to fuse together to form a layer on the mold. When the layer is cured it is stripped from the mold to form a thin-walled plastic part with a shape that corresponds t that of the mold surface.

In mass producing such parts it is desirable to conform the mold heating chamber to a variety of mold shapes. This requires a balancing of the heating chamber and the air flow rates thereto which will result in energy efficient and timely increases in the mold temperature to a desired level.

The present invention includes an octopus casting machine 10. The heating balance is accomplished by use of an indexable hot air tube sheet assembly 20 which is associated with an oven heating system 30 operative to selectively heat molds 40 which are inputted at a mold loading station 50 on the octopus casting machine 10.

Referring now FIG. 1, the octopus casting machine 10 includes a plurality of arms 12a–12h (eight in number) which are supported on a rotatable base 14 driven by suitable drive means more specifically set forth in U.S. Pat. No. 4,755,333 for Mold Method and Apparatus for Plastic Shells with a common assignee.

Figure 2:
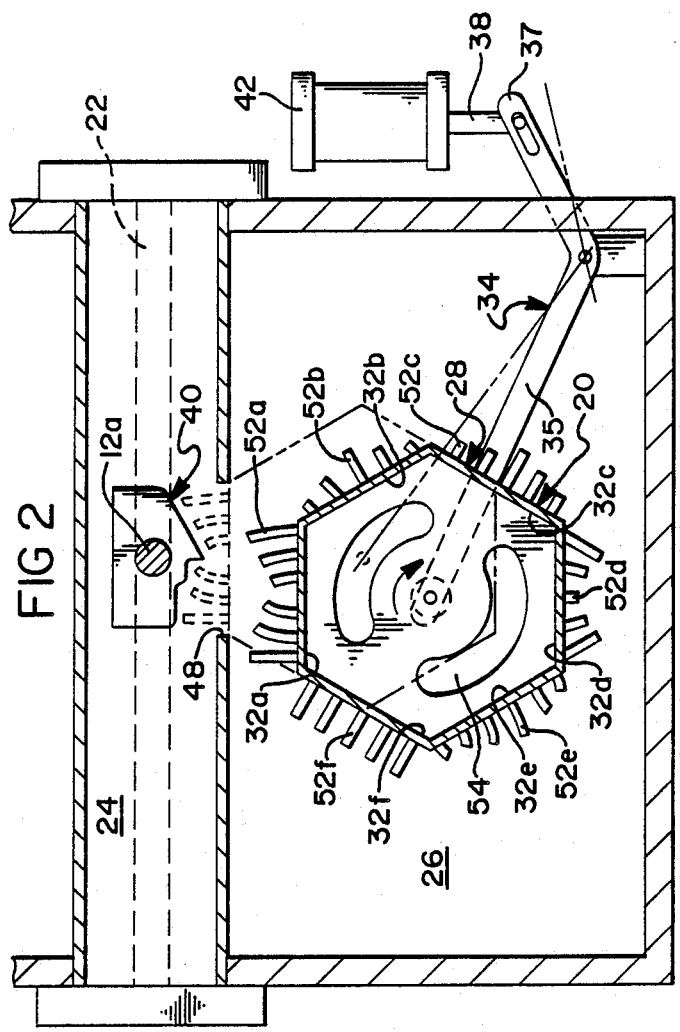
FIG. 2 is a sectional view taken along the line 2—2 of FIG. 1 looking in the direction of the arrows.

Once a selected mold 40 is placed on the mold loading station 50 and transferred to the octopus machine 10, it is advanced by the machine to the oven heating system 30. The oven heating system 30 includes a sealed enclosure 16 having an inlet door 18 and an outlet door 19. A sealed slot 22 is provided for movement of the mold 40 into a sealed heating chamber 24 of the oven heating system 30. As best shown in FIG. 2, the heating chamber 24 is located above a sealed feed chamber 26 in which the tube sheet assembly 20 is located.

The tube sheet assembly 20 includes a hot air drum 28 formed by six separate tube sheets 32a–32f that define a hexagonally configured outer surface on the drum 28. The drum 28 is supported on a pair of spaced positioning arms 34 each of which is in the form of a bell crank having one end 35 connected to an end 36 of the drum 28 and having its other end 37 connected to the end of piston 38 driven by an air cylinder 42. The air cylinder 42 is controlled in response to movement of a mold 40 into and out of the heating chamber 24 to extend or retract the piston 38. This action will raise and lower the drum 28 in the feed chamber 26. When the drum is in the lower position shown in solid lines in FIG. 2, it can be rotated by a suitable drive motor 44 and drive train 46 to position a selected one of the tube sheets 32a–32f into alignment with an inlet port 48 to the heating chamber. The drum 28 is then raised as shown in broken outline form in FIG. 2.

By virtue of the elevator action of the air cylinders 42, the tube sheets are positioned below the port 48 such that a plurality of set of hot air tubes 52a–52f, disposed respectively on each of the tube sheets, will be located out of the transfer path of the mold 40 is it enters and leaves the heating chamber 24.

Figure 3:
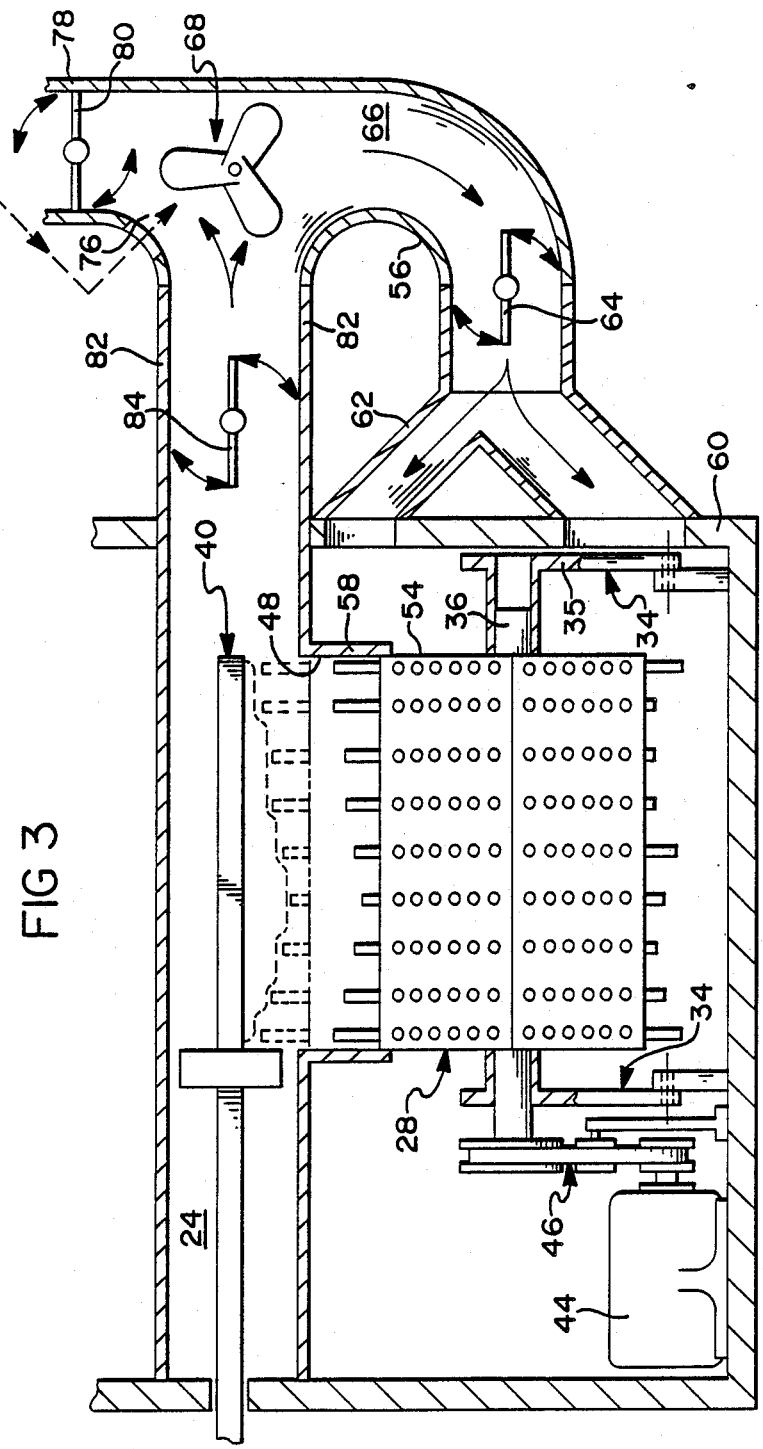
FIG. 3 is a sectional view taken along the line 3—3 of FIG. 1 looking in the direction of the arrows.

The drum 28 has an inlet 54 which is connected to a hot air conduit 56 through a sealing collar 58. The collar 58 rides on the inlet 54 to seal it with respect to the outlet 60 from a heater duct 62. The duct 62 has a control valve 64 disposed therein which is positioned to open and close communication with the outlet 66 from a blower 68 that pressurizes a source 70 of heated air. The source 70 is heated by a gas burner 72 located in a combustion chamber 74. The combustion chamber 74 communicates with the blower inlet 76 as shown in FIG. 3. A bypass duct 78 is provided with a valve 80 to return air back to the combustion chamber when the valve 64 is closed. The bypass duct 78 also recirculates return air from the heating chamber 24 via a duct 82 having a control valve 84 therein which is closed during recirculation but which opens to provide hot air recovery from an enclosed oven system.

Figures 8, 9:
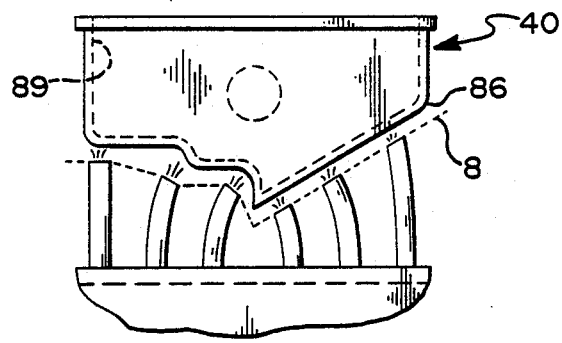
FIG. 8 is an enlarged elevational view of the outer surface profile of a mold and a matching array of hot air tubes.
FIG. 9 is a method sequence of the present invention.

In accordance with the present invention each of the molds 40 will have a preselected outer profile as shown in FIG. 8 by reference numeral 86. The shape of each profile 86 is inputted to a controller 85 when a mold 40 is loaded on the octopus machine 10. The information is fed to suitable control means such as shown in the aforedescribed U.S. Pat. No. 4,755,333 which will be programmed to concurrently operated the drive motor 44 to index the drum 28 so as to position one of the plurality of sets of tubes 52a–52f which has a tube outlet profile 88 which corresponds to the profile 86 on the selected mold 40. Consequently jets of hot air from the outlet profile 88 will impinge uniformly against the matched profile of the mold 40 so as to efficiently and uniformly heat the mold in a manner which will reduce the time required to heat the casting surface 89 of the mold 40 to a temperature at which dry thermoplastic particles will become fused thereon.

FIG. 9 outlines the method of the present invention which includes the steps of providing a plurality of molds with different outer profile shapes; providing a hot air drum of the aforedescribed type and indexably supporting it with respect to a mold of a predetermined shape. As shown in FIG. 9 the method thereafter includes the steps of advancing a mold into overlying relationship with a hot air drum to match the tube profile with the mold surface profile; directing hot air through a selected tube sheet having a tube outlet profile thereon matched to the outer surface profile of the selected mold; and uniformly increasing the temperature of the mold casting surface by directing air through the matched air tube outlet profile against the matched mold profile.

The improved method balances the heat capacity of a mold heating system to each of a plurality of molds as they are selectively positioned in a heating chamber of the heating system. Prior systems only were able to balance the size of the oven to accommodate a range of tool sizes and shapes and the remainder of the heat balancing was accomplished by grinding the mold surfaces and providing heat sinks, baffles and other mold adjustments to assure that the differing mold types would be uniformly heated at a rate which would be suitable for a continuous production cycle in which one of many mold types were being heated.

Because of the present invention, each mold 40 passing through the oven heating system 30 will reside in the heating chamber 24 for an optimal time period. Larger mold profiles will be matched with hot air tubes 52 that define a larger profile of tube outlets and smaller profiles will be matched with hot air tubes 52 that define a smaller matching tube outlet profile so as to standardize the mold heating resident time.

Each of the molds 40 will then be advanced from the heating system 30 to sequentially pass through a casting station 90 at which the mold is clamped to a powder box 92 off-loaded onto the octopus machine from a powder box carousel 94. The arm 12 is rotated to cause material from the powder box to cast onto the heated casting surface 89 of the mold 40. Excess material is returned to the powder box 92 when the mold 40 is inverted.

From the casting station 90 the mold 40 with thermoplastic particles fused on the casting surface 89 is advanced into a curing oven 96. Once the cast material is cured the mold 40 can be moved to filler molding station 98 which is described in detail in the aforedescribed 014,754 application. The mold 40 alternatively or sequentially can be moved to a second cure oven 100 or to a water cooling station 102 where the mold 40 is cooled so that a heat fused shell in the mold 40 can be removed therefrom.

The use of a water cooling station means that the indexable tube sheet assembly 20 can be designed specifically for hot air flow against a mold on a matched heat flow/mold profile basis. This enables the tubes to be sized to flow only heated air rather than both heating and cooling air. The resultant structure is thus matched both on a profile basis and on an optimized air capacity basis. As a result the molds 40 are heated in minimum of time by the least amount of air flow thereby to conserve the amount of fuel consumed in the heating process.

Referring now to the embodiment in FIGS. 4–7 an indexable tube sheet assembly 104 is shown which is supported in a feed chamber 106 that is sealed with respect to opposed air inlets 108, 110 at either end of the indexable tube sheet assembly 104. The inlets 108,110 are connected by rotary joints 112,114 respectively which are joined to a hot air feed loop 115 from a heated air source (not shown).

An oven enclosure 116 includes an air enclosure plate 118, which has fixture doors 120,122 that are driven by suitable drive means (not shown) between opened (FIG. 6) and closed (FIG. 7) positions with respect to a selected tube sheet 124. As shown in FIG. 6, tube sheet 124 has a tube outlet profile 125 matched to the outer surface profile 126 of a mold 127. Mold 127 is located in a heating chamber 128. As in the previously described embodiment the hexagonally shaped drum configuration is custom-tubed to match the mold configuration for different tools. As each arm of the molding unit moves into the heating chamber 128 the process controller will condition a drive system 130 to rotate the assembly 104 to match the proper heating profile to the mold/tool profile. Once the two profiles are matched the doors 120,122 are closed. This causes the feed chamber 106 to be pressurized as hot air flows through the two inlets 108,110. The chamber 106 is sealed so that all the air flow passes through the selected tube sheet against the matched mold. The feed of hot air through both ends of the assembly 104 evenly pressurizes the tube array for producing a further matching of the heat transfer to the mold.

After the mold 127 is heated it is moved from the heating chamber 128 and the next mold tool and tube sheet are matched to continue the process. As in the first embodiment such indexing or rotation of the six-sided tube sheet assembly 104 is synchronized with the operation of the casting machine 10 so as to result in a custom heating capability heretofore unattainable.

While the process has been described with respect to thin shell cast members it is equally suited for any mold process in which it is desirable to precisely match the flow of heated gas against a mold part to uniformly heat a mold surface thereon for molding a part from material placed in the mold. The process is not limited to the manufacture of interior trim parts but is suitable for use in the manufacture of a wide range of product types from a wide range of fusable thermoplastic materials.

What is claimed is:

1. In apparatus for casting plastic shells heating mold having a casting surface for receiving heat fusable thermoplastic material and an outer surface with a profile that corresponds to the shape of the casting surface, the outer surface heated by hot air flow thereagainst from a tube sheet having a plurality of tubes extending therefrom with outlets that define a profile corresponding to that of the outer surface of the mold, the outlets discharging into an enclosure having a mold heating chamber therein and wherein a plurality of molds of different outer surface profile are sequentially positioned in the heating chamber to have the casting surface temperature raised to a level at which the material will adhere to the mold to form a plastic shell thereon, the improvement comprising:

means forming a feed chamber having a outlet in communication with said heating chamber;

a drum supported in said feed chamber having a plurality of tube sheets formed thereon, each of said tube sheets having a plurality of tubes formed thereon of a predetermined height which define a plurality of tube outlets defining an air discharge profile that corresponds to the outer surface profile of molds which are positioned in the heating chamber;

means for selectively positioning the drum to index one of said tube sheets into alignment with said feed chamber outlet for matching the profile of one of the outer surface profiles with the air discharge profile of the indexed tube sheet;

and means for directing heated air through the indexed tube sheet for causing the mold casting surface to be uniformly heated there across prior to placing heat fusable thermoplastic material thereon.

2. In the combination of claim 1, a blower, said drum having inlet openings in both ends thereof, means including a rotary joint for connecting said inlets to said blower and means for sealing said tube sheets with respect to said feed chamber outlet to prevent bypassing of air from the outlets of the indexed tube sheet back to the feed chamber.

3. In the combination of claim 1, means for supporting said drum for movement into raised and lowered positions with respect to said heating chamber, said tube sheets having the outlets thereof located out of said heating chamber when in the lowered position for defining an unobstructed path for movement of a selected mold into the heating chamber.

4. In the combination of claim 1, a blower, said drum having an inlet, means including a rotary joint for supporting said drum for rotation with respect to the feeder chamber outlet and for fluidly connecting said blower to said drum inlet, and means for sealing said tube sheets with respect to said chamber outlet to prevent bypass of heated air from the outlets of an indexed tube sheet to said feed chamber.

* * * * *